United States Patent

McAllister et al.

[15] 3,668,750

[45] June 13, 1972

[54] AUTOMATIC PROCESSING EQUIPMENT FOR MICROELECTRONIC CIRCUITS

[72] Inventors: Lewis L. McAllister, Marion; Wencil D. Popek, Cedar Rapids, both of Iowa

[73] Assignee: Collins Radio Company, Dallas, Tex.

[22] Filed: Jan. 11, 1971

[21] Appl. No.: 105,394

[52] U.S. Cl. ..............................29/33 M, 29/203 R, 29/577, 174/DIG. 3

[51] Int. Cl. ....................................B23p 23/04, B23p 21/00

[58] Field of Search..................29/33.5, 33 M, 203 R, 203 B, 29/590, 591, 576 S, 577; 174/DIG. 3

[56] References Cited

UNITED STATES PATENTS 3,597,824 8/1971 Yoshida et al........................29/203 B

*Primary Examiner*—Francis S. Husar
*Attorney*—Henry K. Woodward and Robert J. Crawford

[57] ABSTRACT

Equipment for automatically processing microelectronic circuits for application in circuits defined on printed circuit boards and the like. A plurality of work stations apply insulative backing to the circuit cases, trim and form the leads, and cold-flow solder ribbon about the formed leads. Circuits may be automatically loaded into the equipment, processed, and unloaded following the completed processing.

18 Claims, 17 Drawing Figures

INVENTORS
LEWIS L. McALLISTER
WENCIL D. POPEK

BY [signature]
ATTORNEY

INVENTORS
LEWIS L. McALLISTER
WENCIL D. POPEK
BY H. K. Woodward
ATTORNEY

INVENTORS
LEWIS L. McALLISTER
WENCIL D. POPEK

BY H. K. Woodward
ATTORNEY

INVENTORS
LEWIS L. McALLISTER
WENCIL D. POPEK
BY H. K. Woodward
ATTORNEY

INVENTORS
LEWIS L. McALLISTER
WENCIL D. POPEK

BY H. K. Woodward
ATTORNEY

INVENTORS
LEWIS L. McALLISTER
WENCIL D. POPEK
BY H. K. Woodward
ATTORNEY

INVENTORS
LEWIS L. McALLISTER
WENCIL D. POPEK

BY H. K. Woodward
ATTORNEY

INVENTORS
LEWIS L. McALLISTER
WENCIL D. POPEK

BY H. K. Woodward
ATTORNEY

AUTOMATIC PROCESSING EQUIPMENT FOR MICROELECTRONIC CIRCUITS

This invention relates generally to automatic processing equipment, and more particularly to automatic processing equipment for microelectronic circuits.

The advent of the integrated circuit has created a revolution in the electronics field. Typically, these microelectronic circuits, defined in small chips of semiconductor material, are hermetically sealed in protective packages with a plurality of leads extending from each package for providing electrical interconnection. As the cost of processing the semiconductor material has been substantially reduced in recent years, packaging costs have become more important, in terms of manufacturing cost, and much attention has been directed to reducing these costs.

In many modern applications, the packaged microelectronic circuits are mounted on printed circuit boards and incorporated into larger and more complicated electrical circuits or sub-systems. For example, a circuit defined on a printed circuit board may include a half-dozen or more packaged microelectronic circuits as well as other discrete electronic components.

Attaching the packaged microelectronic circuits on printed circuit boards entails considerable labor and cost. For example, the leads of the integrated circuit must be shaped for positioning through holes in the printed circuit board or otherwise for positioning on electrical contacts on the printed circuit board, and subsequently each lead must be soldered to the board. Heretofore, most of these various operations have been performed manually, necessitating considerable time and labor and consequently entailing considerable cost. Further, the manual operations require removal of each circuit from its protective carrier and the subsequent handling of the circuits produces a significant percentage of damaged circuits which must be discarded.

An object of the present invention is automatic process equipment for preparing packaged microelectronic circuits for mounting on printed circuit boards and the like without the necessity for manually handling the microelectronic circuits.

Another object of the invention is automatic process equipment for applying insulation to an integrated circuit package, shaping the electrical leads of an integrated circuit, and applying solder ribbon to the shaped leads.

Features of the invention include an input station for feeding in packaged integrated circuits, a conveyor system, a plurality of work stations for applying insulation, shaping leads, and applying solder ribbon to the formed leads, and an output station for receiving the processed integrated circuits. A circuit carrier is used for transporting the integrated circuits and for facilitating the lead shaping. Additionally, test stations may be included for performing electrical tests and the like on the circuits prior to processing.

These and other objects and features of the invention will be more fully understood from the following detailed description and appended claims when taken with the drawings, in which:

Figures 7, 7A:
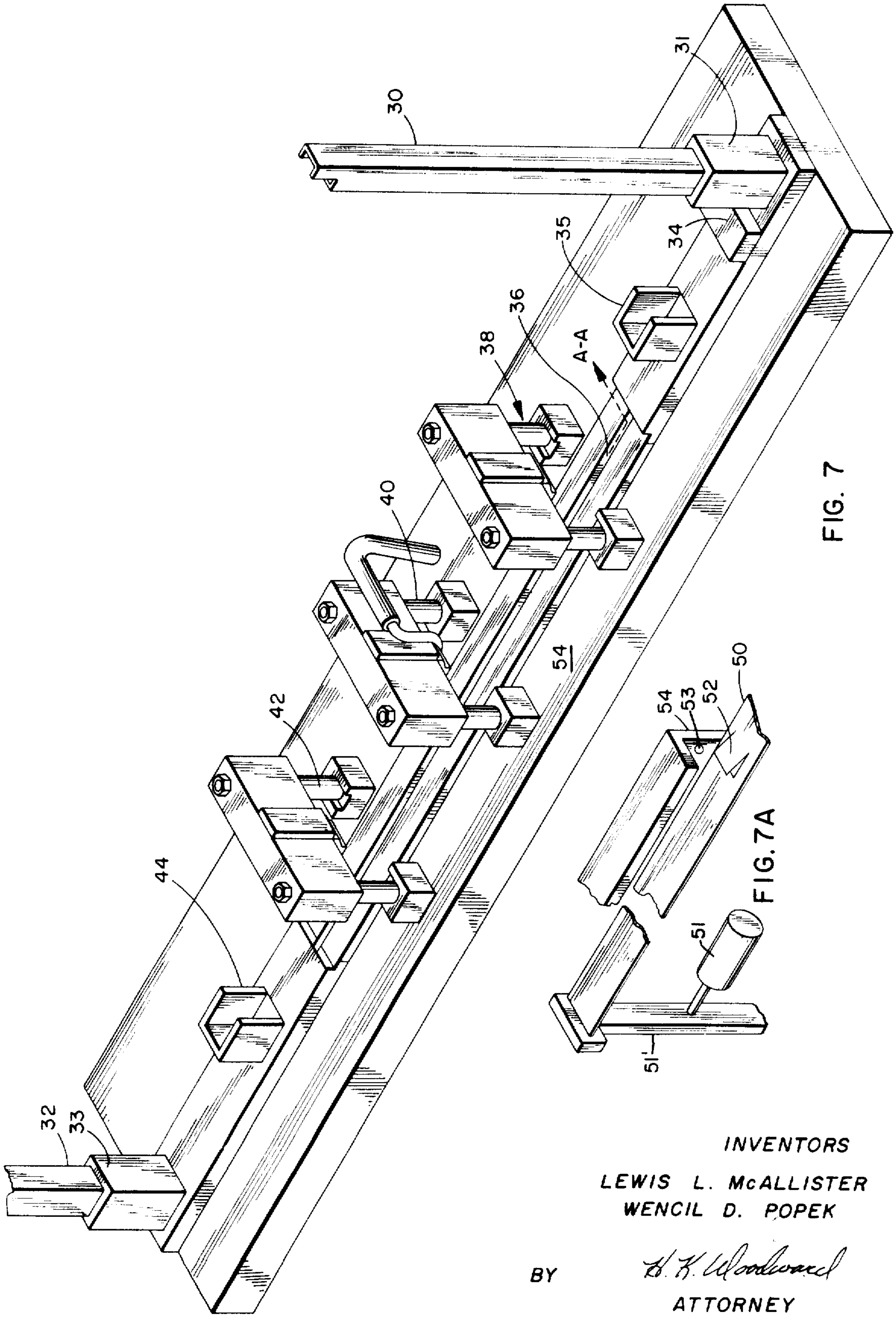
FIG. 7 is an isometric view of automatic processing equipment in accordance with the present invention.
Figures 8, 8A:
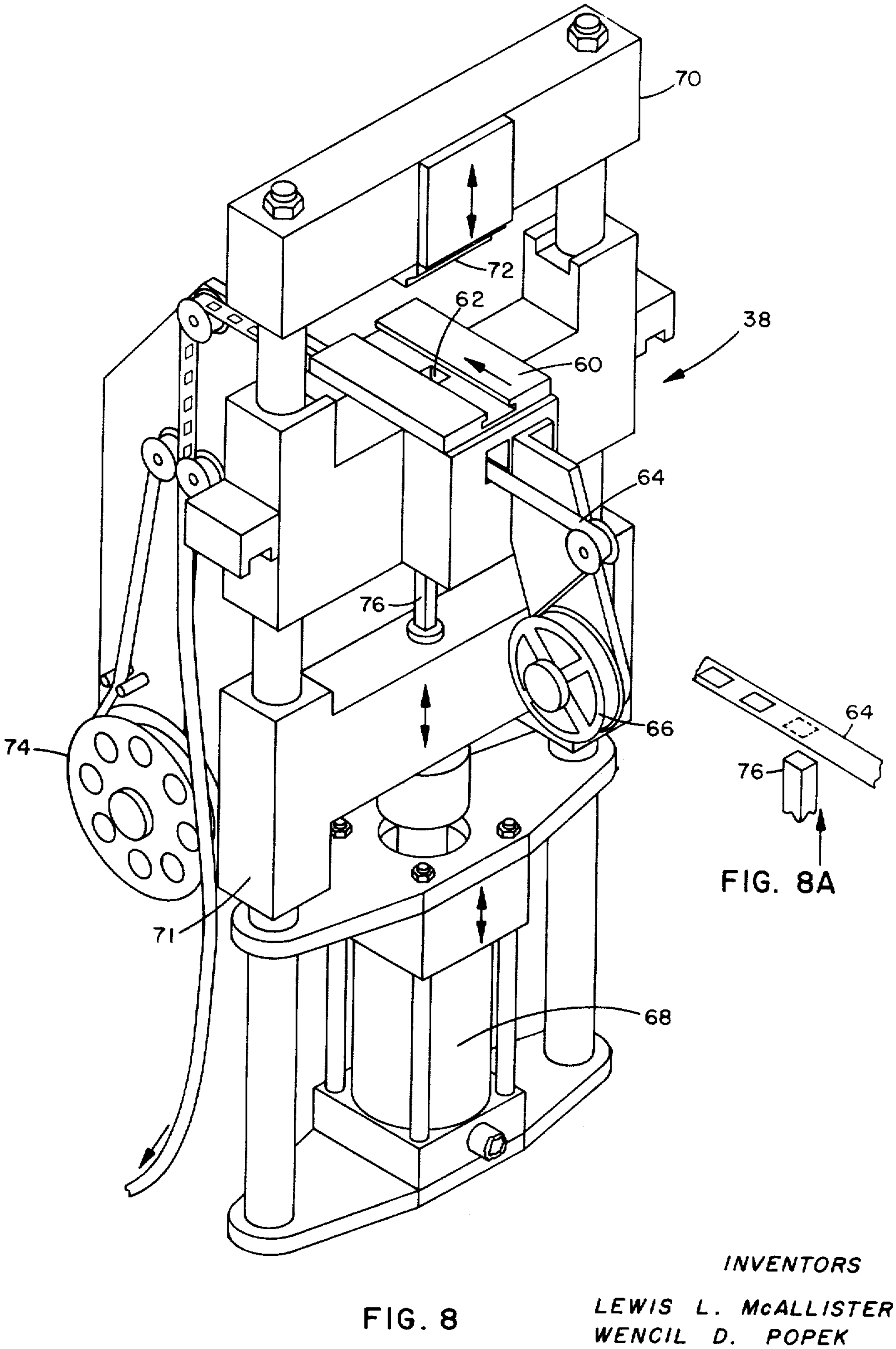
Figure 9:
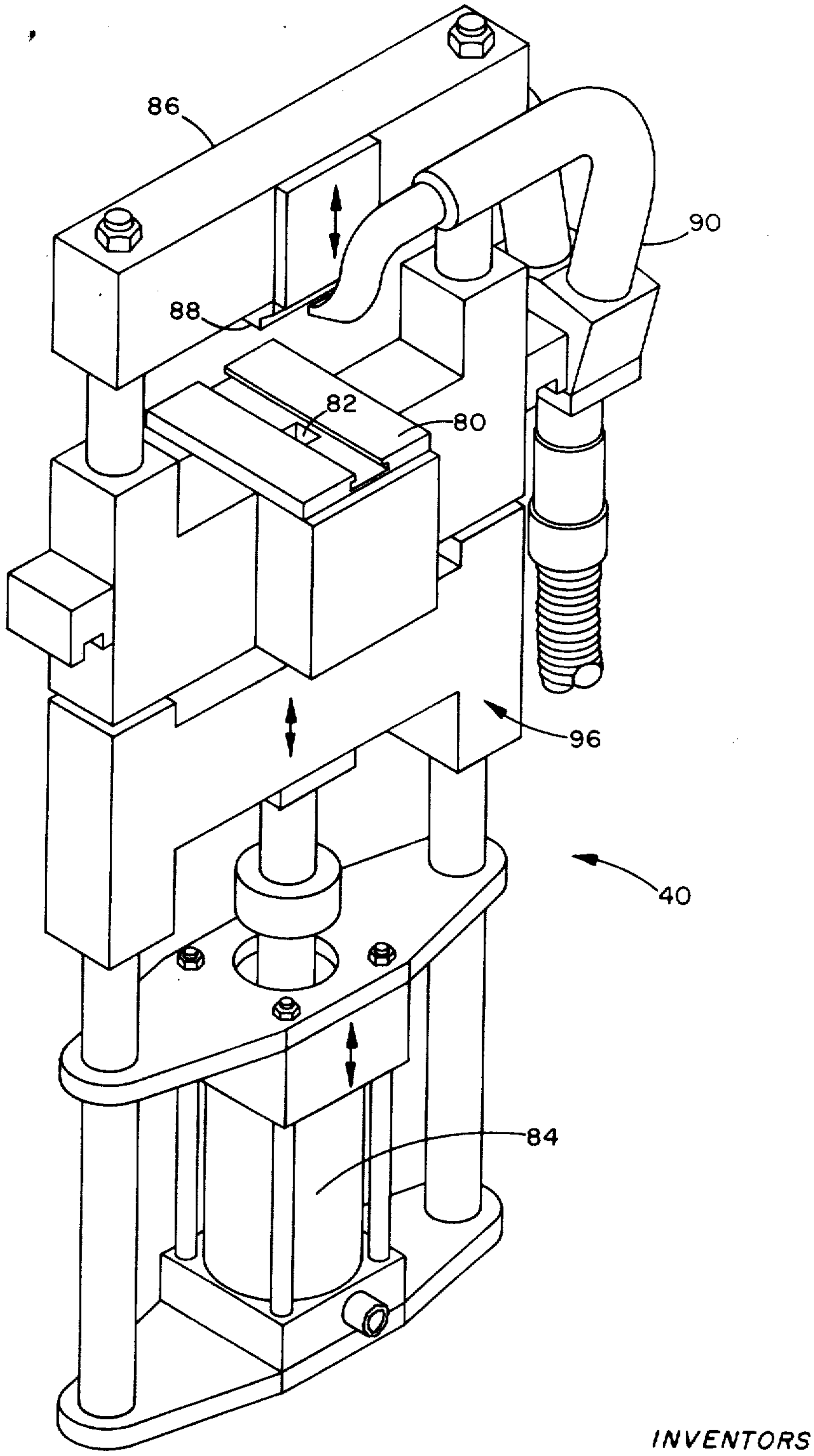
Figure 10:
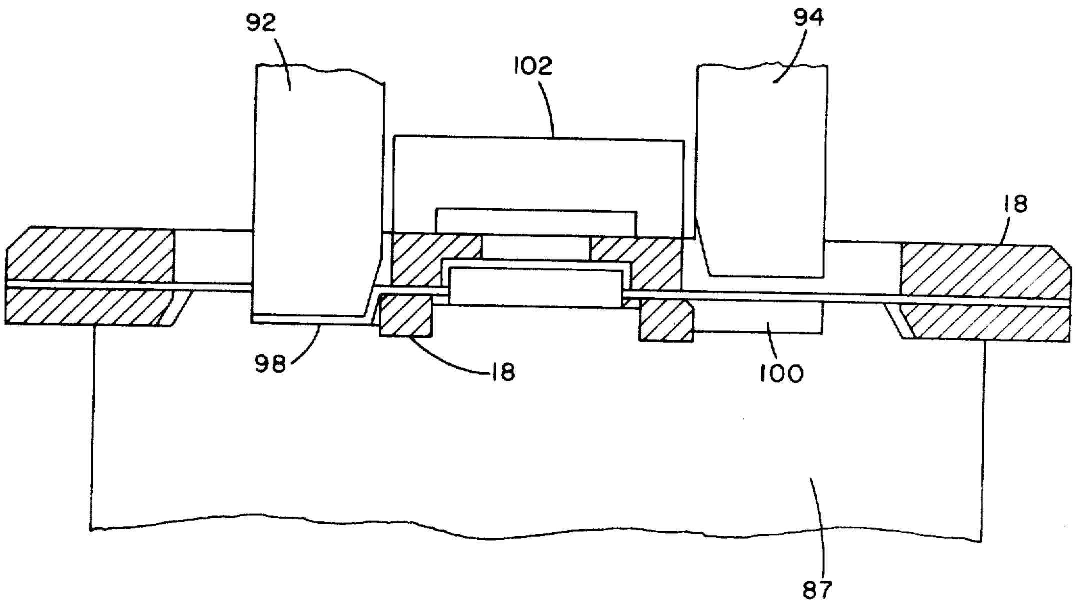
Figures 11, 11A:
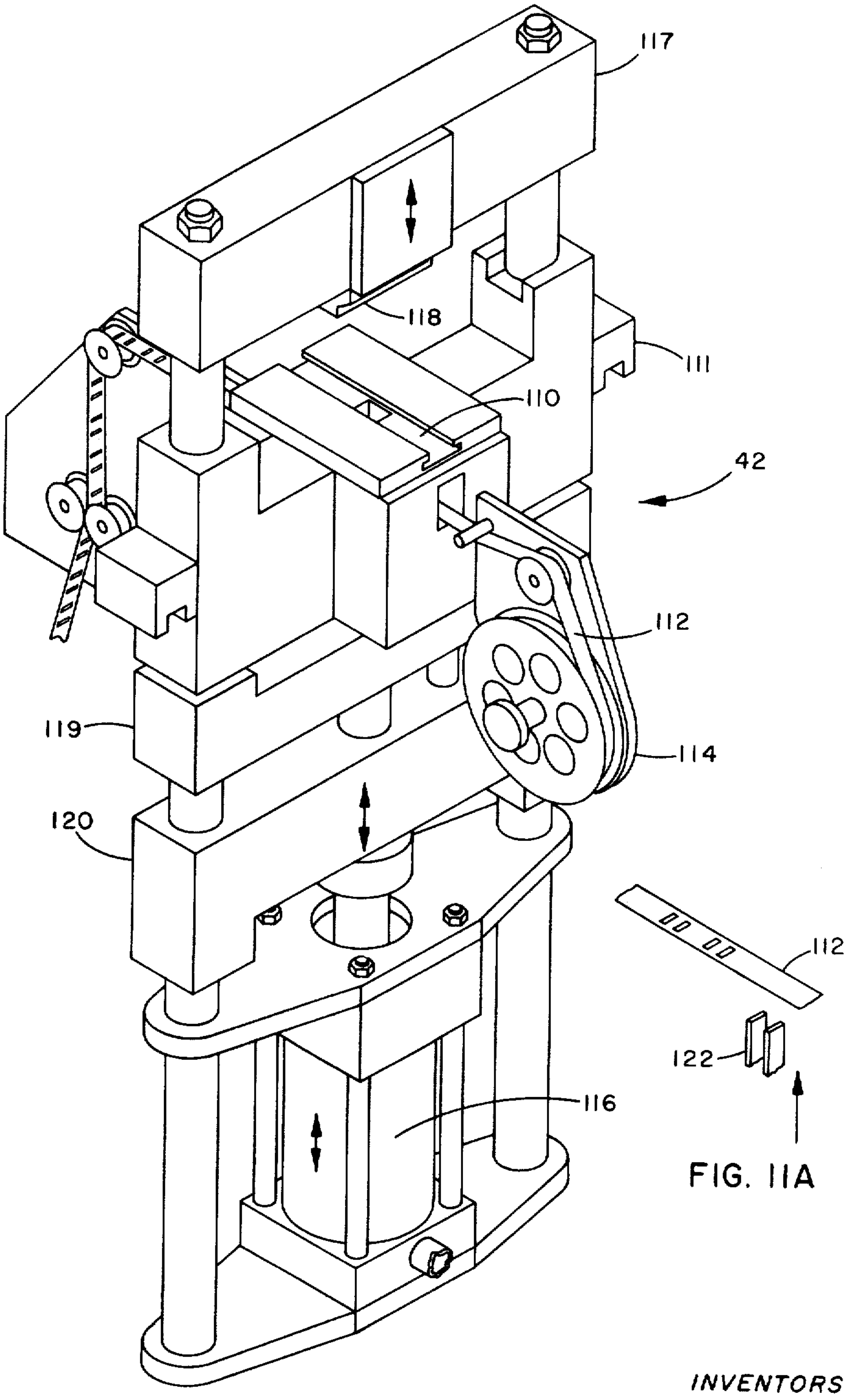
Figure 12:
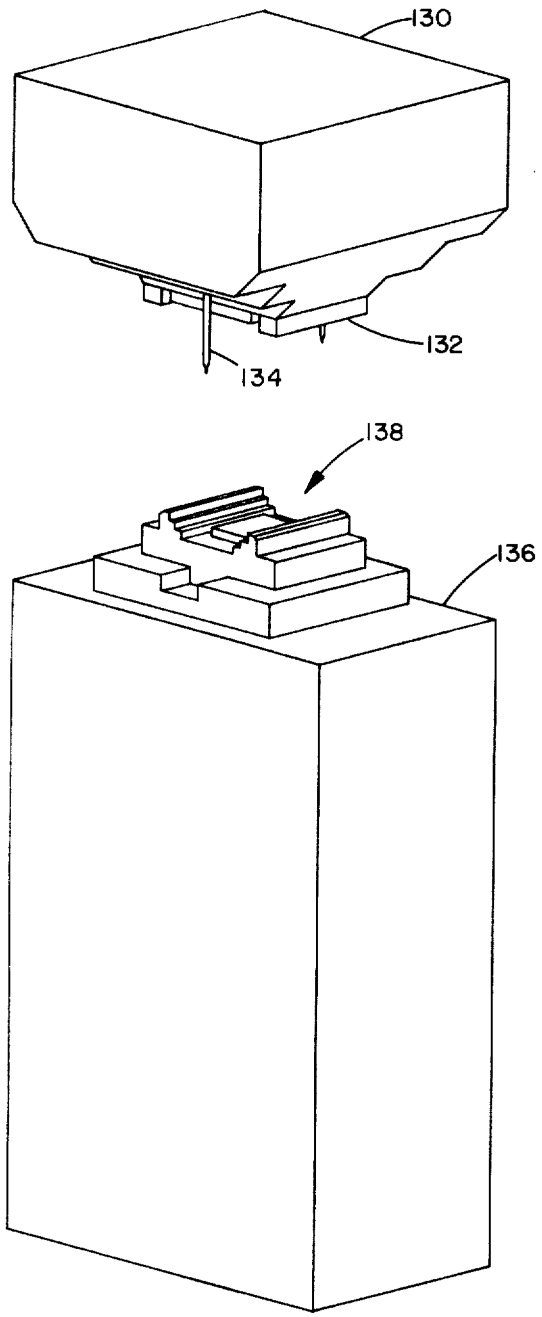
Figure 13:
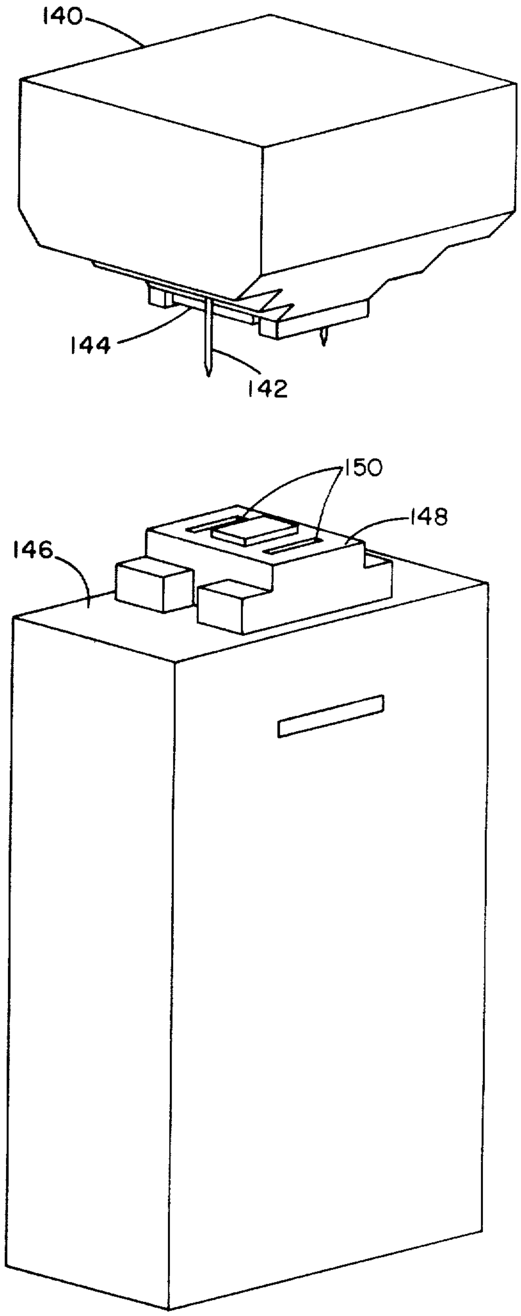

FIG. 7*a* is an isometric view of the conveyor means taken along line A—A of FIG. 7;

FIG. 8 is an isometric view of the insulation application work station;

FIG. 8*a* is an isometric view of the punch means of the insulation application work station;

FIG. 9 is an isometric view of the lead forming work station;

FIG. 10 is a plan view illustrating the operation of the lead forming work station shown in FIG. 9;

FIG. 11 is an isometric view of the solder ribbon application work station;

FIG. 11*a* is an isometric view of the punch means of the solder ribbon application work station;

FIG. 12 is an isometric view of the lead forming punch;

FIG. 13 is an isometric view of the solder preform punch; and

Figure 14:
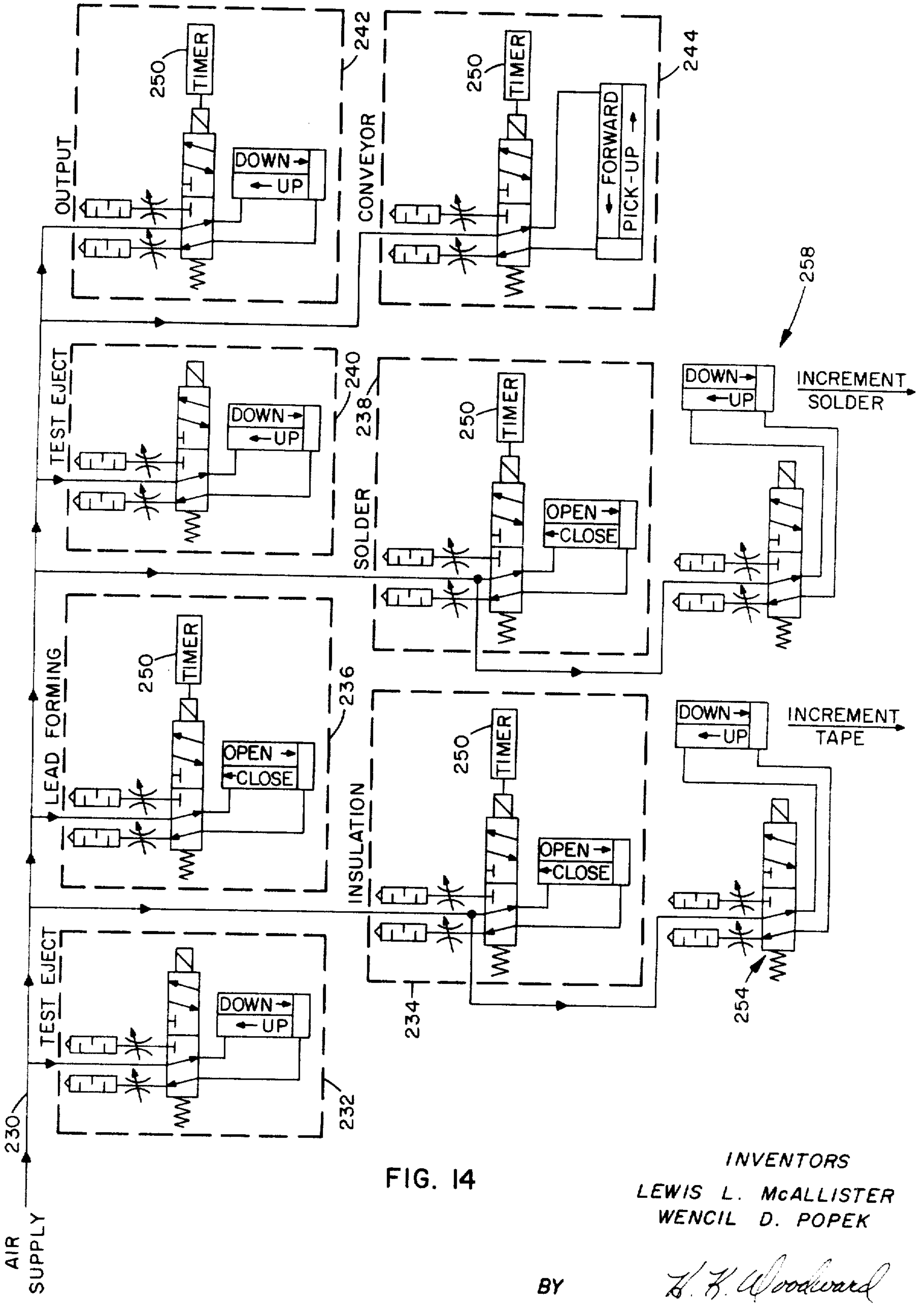

FIG. 14 is a schematic of a pneumatic system for operation of the automatic process equipment in accordance with the present invention.

Figure 1:
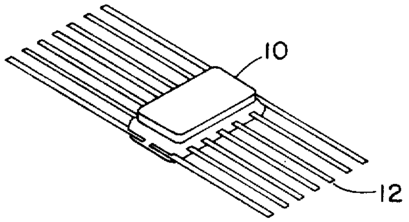
FIG. 1 is an isometric view of a conventional microelectronic circuit.

Referring now to the drawings, FIG. 1 is an isometric view of a conventional packaged microelectronic circuit. The semiconductor integrated circuit is hermetically sealed in package 10 and a plurality of leads 12 extend from the package and provide electrical interconnections for the sealed integrated circuit.

Figure 2:
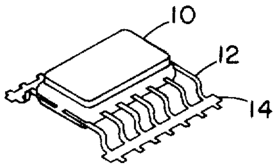
FIG. 2 is an isometric view of an integrated circuit after processing with equipment in accordance with the present invention.

In many applications, the packaged microelectronic circuits are mounted on printed circuit boards and incorporated into larger and more complicated electrical circuits. Typically, the leads 12 are shaped for positioning on contacts on a printed circuit board or the like, and each lead is then soldered to the contacts. The soldering may be facilitated by applying a solder ribbon to the leads and then heating the ribbon to effect the soldering of all contacts in one operation. FIG. 2 is an isometric view of the microelectronic circuit of FIG. 1 after lead shaping and solder ribbon application in preparation for mounting on a printed circuit board. Leads 12 are shaped for mounting on a planar surface and solder ribbon 14 is provided for subsequent bonding of the leads to electrical contacts.

In addition to the lead forming and solder ribbon application, the bottom surface of the packaged device is normally provided with an insulation material for electrically isolating the metal package from the circuitry on the board. This material may expeditiously be a pressure sensitive adhesive tape which is attached to the bottom surface.

Figure 3:
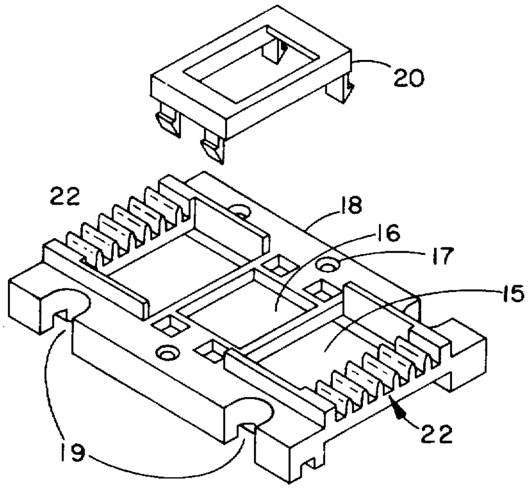
FIG. 3 is an exploded isometric view of circuit carrier means utilized with equipment in accordance with the present invention.
Figure 4:
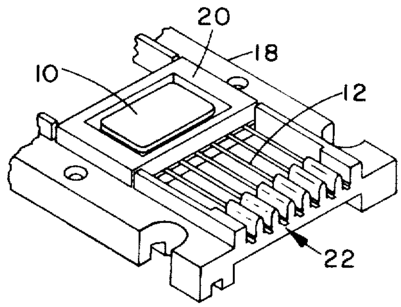
FIG. 4 is an isometric view of a portion of the carrier of FIG. 3 with the circuit of FIG. 1 loaded therein.

Each of the operations described above has heretofore been performed separately and with considerable manual labor. In accordance with the present invention a microelectronic circuit received in the form shown in FIG. 1 is automatically processed as shown in FIG. 2 for mounting on a printed circuit board or the like with the elimination of all manual processing. This automatic processing is facilitated by a circuit carrier such as shown in the exploded view of FIG. 3. Carriers of this type are well known in the art. The container portion of the microelectronic circuit is received in the open region 16 of the base member 18 of the carrier and the cover 20 snaps onto base member 18 and retains the circuit in the base member with the leads of the circuit extending outwardly and supported by the rib portions 22 at either end of the base member, as illustrated in FIG. 4. Holes 17 in the top of base member 18 are provided to receive pilot probes at each work station to insure accurate circuit positioning prior to processing.

Figure 5:
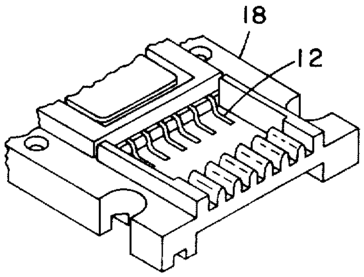
FIG. 5 is an isometric view of the integrated circuit and carrier after lead forming in accordance with the present invention.
Figure 6:
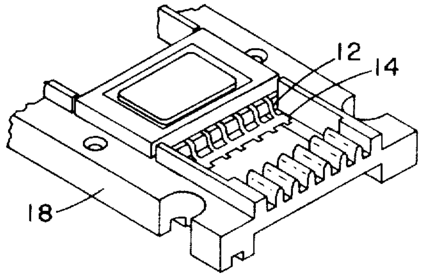
FIG. 6 is an isometric view of the integrated circuit and carrier subsequent to the application of solder ribbon to the formed leads.

In accordance with the present invention, the microelectronic circuit is processed while in the carrier, including the application of insulating tape through the open region 16 of the carrier base and onto the bottom surface of the circuit package, the shearing and shaping of the leads 12 as shown in FIG. 5, and the application of the solder ribbon 14 through the carrier open regions 15 to leads 12, as shown in FIG. 6.

With the process steps illustrated in FIGS. 1–6 in mind, FIG. 7 is an isometric view of automatic processing equipment in accordance with the present invention for implementing the process steps. The equipment includes an input station including magazine 30 and socket 31 for receiving a plurality of carriers containing unprocessed microelectronic circuits, and an output station including magazine 32 and socket 33 at the opposite end of the equipment for receiving the carriers and microelectronic circuits after processing. Between the input and output stations are a plurality of work stations, six such stations in this embodiment, including a first test station 34 for testing the unprocessed microelectronic circuits and an eject station 35 for removing defective circuits. Thereafter, the circuits are moved by conveyor means 36 to a first processing station 38 where insulating tape is applied to the bottom surface of the circuits. Thereafter, the conveyor means moves the circuit to a second processing station 40 which cuts and forms the circuit leads to the desired length and configuration. The conveyor means then moves the circuits to a third process station 42 where solder ribbon is automatically applied to the formed leads. Finally, the conveyor means moves the completely processed circuits to a second test station 44 where defectively processed circuits may be identified and removed. The processed circuits, which are ready for mounting on printed circuit boards, are then received in their respective carriers at the output station.

One embodiment of conveyor means is illustrated in the perspective view of FIG. 7*a* which is taken along the line A—A of FIG. 7. In this embodiment an elongated member in the form of a metal tape 50 is positioned along the length of the conveyor line of the equipment in FIG. 7. A raised detent 52 is provided in the tape at positions corresponding to each of the work stations of the equipment. In moving a circuit from one work station to the next, the circuit carrier is maintained in position on tape 50 by means of channels 54 on either side of tape 50 and the raised detent 52 engages the edge of a carrier and advances the carrier to the subsequent work station. Tape 50 has a travel equal to the distance between each work station, and after each advancement of the circuit, the tape 50 is returned to its initial position by means of reciprocal drive pneumatic motors 51 which drive tape 50 through pivotal arms 51′ at each end of the conveyor. Raised detent 52 is flexible and slides beneath the positioned carriers in returning to this initial position. The carriers are prevented from moving backward upon this repositioning of the tape 50 by means of suitable mechanical stops at each work station, such as spring biased spherical detent 53 which yieldably mates with notches 19 of carrier base 18, shown in FIG. 3.

The carriers are stacked in magazine 30 at loading station and are gravity fed through socket 31 to the conveyor. The initial test station 34 may be merely a visual inspection station, a simple optoelectronic testing means to check for the presence of a loaded carrier at the work station, or a more elaborate electrical test means for electrically testing the operability of the packaged circuits. In the event of a defective circuit, empty carriers or the like, the circuit and carrier may be automatically ejected or a signal light may indicate a test failure and require manual resetting. In either case, automatic operation will cease until this station is provided with another circuit and carrier.

Thereafter, the carrier protected circuits are moved to the first process station 38 where electrical insulating tape is applied to the bottom surface of the packaged circuit. FIG. 8 is an isometric view of this work station. Channel portion 60 receives the circuit carriers in position over opening 62 for application of insulating tape to the bottom surface. The insulation tape 64 is fed adhesive side up from reel 66 beneath opening 62 where punch means driven by pneumatic cylinder 68 shears portions from tape 64 and transfers the sheared tape into pressure engagement with the bottom surface of the microelectronic circuit. Upon actuation of pneumatic cylinder 68, member 70 is moved downwardly until support portion 72 abuts the top surface of the microelectronic circuit. Pilot punches on portion 72 mate with holes 17 in the circuit carrier to insure accurate positioning. Thereafter, the punch means 71 is driven vertically upwardly to shear and position tape portions on the bottom of the circuit. After each circuit is processed at this station and tape is indexed, the unused portion of the tape is affixed to a paper strip from reel 74 (for ease of handling) and then discarded.

FIG. 8*a* illustrates the rectangular punch which shears rectangular segments from the tape 64 and moves said sheared portions upwardly into engagement with the bottom surface of the circuit. After shearing the tape, the sheared portion is elevated to firm contact with the bottom of the circuit package.

After the tape is applied to the bottom surface of the circuit, the pneumatic press opens and the circuit and carrier are advanced to the next process station 40 for lead forming. This station is illustrated in FIG. 9. The circuit and carrier are advanced in work support member 80 to the platen 82 for the subsequent lead forming. As above noted, suitable mechanical stops are provided in the channel portion of work loader 80 to maintain the circuit in position upon the retraction of the conveyor means. Such stops may be spring loaded detents aligned in the channel which allow carriers to advance to the work station but which engage the carrier to prevent reverse movement of the carrier.

Pneumatic cylinder 84 drives member 86 downwardly and member 96 upwardly with punch portion 88 shearing and forming the circuit leads, as will be illustrated further below with reference to FIG. 10. Again, pilot punches on member 86 engage holes 17 in the carrier to assure accurate positioning. Vacuum means shown generally at 90 is provided to remove the sheared portion of the circuit leads.

Referring now to FIG. 10, operation of the punch in shearing and shaping the leads is illustrated. The upper punch includes two forming portions 92 and 94 for shearing and forming leads on either side of the package. For purposes of illustration, punch 92 is shown in position after shearing and forming a lead, and punch portion 94 is shown in the upward position prior to the shearing and forming of the leads. As described above, the lower punch portion 87 moves upwardly in firm engagement with the carrier 18, and subsequently punches 92 and 94 are moved downwardly to shear and form the leads. The platen face of the lower punch member 87 includes the depressed areas 98 and 100 into which the leads are depressed for forming and shearing. It is to be noted that the upper punches 92 and 94 cooperate with carrier 18 in forming the leads. The upper punch also includes a spring biased member 102 which moves into pressure engagement with the microelectronic package prior to the punch members 92 and 94 commencing the lead forming. Member 102 applies sufficient compression force on the carrier top to maintain position of the circuit leads. This force counteracts subsequent shear forces generated during the lead forming operation and prevents fracturing of the glass seal of the leads in the circuit case.

Following the lead forming and shearing operation, the press opens and the circuit and carrier are indexed to the next process station 42 where solder ribbon is applied to the formed leads. This work station is illustrated in FIG. 11. The carriers are similarly indexed in work holding member 110, as above described with reference to work stations 38 and 40. Solder ribbon stock 112 is taken from reel 114 and fed adjacent to the bottom surface of a circuit positioned in channel 110 in stationary member 111. Pneumatic cylinder 116 drives member 117 downwardly until support surface 118 engages the top of the circuit and the shaped leads. Pilot punches again assure proper positioning. Thereafter, lower member 119 moves upwardly to back-up the upper portion 118. Thereafter, member 120, carrying two solder shear blades 122, moves upwardly. The blades shear portions of the solder ribbon and then cold-flow the solder about the circuit leads. This operation is normally the longest process (e.g., four seconds) and determines the time cycle for the automatic process cycling.

FIGS. 12 and 13 further illustrate the punches at the lead forming station and the solder preform stations, respectively. In FIG. 12, the upper punch 130, which is carried by member 86 in FIG. 9, includes forming portions 132 (only one shown in this view) and the pilot probes 134. The lower punch 136 includes the platen face shown generally at 138 and which is described with reference to FIG. 10.

Similarly, in FIG. 13 the solder preform punch includes an upper punch 140 which includes pilot probes 142 and pressure pad 144 which abuts a circuit during processing. The lower punch 146 includes a forming anvil or platen 148 with slots 150 on either side of platen 148 through which solder shear blades 122 move. The upper punch is carried by member 117, the lower punch by member 119, and the shear blades by member 120, referring back to FIG. 11.

FIG. 14 is a schematic of the pneumatic system for operation of the automatic process equipment embodiment described above. The input station for receiving unprocessed circuits is gravity fed and thus does not require pneumatic drive means, all other work stations are pneumatically operated. A common air supply line 230 provides the pneumatic pressure for the drive means for the first test ejection station 232, the insulation application work station 234, the lead forming work station 236, the solder application 238, the second test eject station 240, the unloading station 242, and the conveyor 244. It will be noted that the switch means for operation of the pneumatic cylinders at the test stations are manually operated whereby an operator may remove the carrier at this test station when a defective circuit is signaled, however, automatic eject can be employed. All other work stations and the conveyor are operated by timer means 250 whereby operation of these stations and the conveyor is synchronized. The timing cycle is established such that the conveyor means 144 advances circuits under process to the subsequent work station prior to the initiation of the other work stations.

It will be noted that the insulation station drive means 234 and the solder station drive means 238 include, cooperatively, tape incrementing drive means 254 and solder incrementing means 258, respectively. Each of these incrementing means is actuated by limit switches which are tripped upon the main work station pneumatic cylinder returning the circuit processing members to the full open position. That is, the tape and solder are each incremented following completion of a process at its respective station.

Automatic processing equipment in accordance with the present invention has proved to be time saving and cost reducing in the testing and processing of microelectronic circuits for attachment on printed circuit boards and the like. While the invention has been described with reference to a specific embodiment, the description is illustrative of the invention and is not to be construed as limiting the scope of the invention. Various modifications and changes may be made by those skilled in the art without departing from the spirit and scope of the invention as defined by the appended claims.

We claim:

1. Automatic processing equipment for receiving multilead microelectronic circuits housed in carriers and processing said circuits for application on printed circuit boards and the like comprising:

a. a first work station for applying insulation to the microelectronic circuit case, b. a second work station for forming the circuit leads to a desired configuration, c. a third work station for applying solder to said formed leads, d. an input station for receiving unprocessed microelectronic circuits, e. an output station for receiving the processed microelectronic circuits, f. conveyor means for conveying microelectronic circuits from said input station to said process stations and said output station, and g. control means for automatically advancing circuit carriers from said input station to each of said work stations and to said output station, and for controlling operations at each of said work stations.

2. Automatic processing equipment as defined by claim 1 wherein said first work station includes punch means for shearing portions from an insulation tape and affixing said sheared portions to the bottom of said microelectronic circuit cases.

3. Automatic processing equipment as defined by claim 2 wherein said second work station includes punch means for shearing and forming said circuit leads, said punch means comprising an upper punch portion and a lower platen portion conforming to the desired lead configuration.

4. Automatic processing equipment as defined by claim 3 wherein said third work station includes punch means for shearing portions of a solder ribbon and cold-flowing said sheared portions about said formed leads.

5. Automatic processing equipment as defined by claim 4 wherein each of said punch means includes pneumatic actuation means and pilot probe means for accurately aligning each circuit and carrier prior to processing.

6. Automatic processing equipment as defined by claim 5 wherein said conveyor means includes a metal tape member, a plurality of raised and flexible detents, channel defining members for accommodating said tape member and circuit carriers riding thereon, and means for reciprocally moving said tape member.

7. Automatic processing equipment as defined by claim 6 wherein each work station has mechanical stops which prevent backward movement of said circuit carriers as said tape member is reciprocally moved.

8. Automatic processing equipment as defined by claim 7 wherein said input station and said output station each comprises a removable magazine in which circuit carriers may be stacked and socket means for receiving said magazine cooperatively with said conveyor means.

9. Automatic processing equipment as defined by claim 8 and further including a first test station for testing circuit carriers loaded onto said conveyor means from said input station and a first eject station for removing carriers from said conveyor means, said first test station and said first eject station preceding said first work station.

10. Automatic processing equipment as defined by claim 9 and further including a second test station for testing processed circuits prior to unloading at said output station, and a second eject station for removing carriers containing defectively processed circuits.

11. Automatic processing equipment as defined by claim 10 wherein said control means functions pneumatically.

12. Automatic processing equipment as defined by claim 1 wherein said second work station includes punch means for shearing and forming said circuit leads, said punch means comprising an upper punch portion and a lower platen portion conforming to the desired lead configuration.

13. Automatic processing equipment as defined by claim 1 wherein said third work station includes punch means for shearing portions of a solder ribbon and cold-flowing said sheared portions about said formed leads.

14. Automatic processing equipment as defined by claim 1 wherein said conveyor means includes a metal tape member, a plurality of raised and flexible detents, channel defining members for accommodating said tape member and circuit carriers riding thereon, and means for reciprocally moving said tape member.

15. Automatic processing equipment as defined by claim 1 wherein said input station and said output station each comprises a removable magazine in which circuit carriers may be stacked and socket means for receiving said magazine cooperatively with said conveyor means.

16. Automatic processing equipment as defined by claim 1 and further including a first test station for testing circuit carriers loaded onto said conveyor means from said input station, a first eject station for removing carriers from said conveyor means, said first test station and said first eject station preceding said first work station, a second test station for testing processed circuits prior to unloading at said output station, and a second eject station for removing carriers containing defectively processed circuits.

17. Automatic processing equipment for multilead microelectronic circuits housed in carriers of appropriate configuration comprising:

a. an input station including a removable magazine for stacking circuit carriers and socket means for receiving said magazine,
b. reciprocating conveyor means for receiving circuit carriers from said input station and advancing said circuit carriers sequentially to work stations,
c. a first test station for testing unprocessed circuits in carriers on said conveyor means, and a first eject station for removing carriers from said conveyor means,
d. a first work station for applying insulation to case portion of each of said microelectronic circuits, said first work station including punch means for shearing portions from an insulation tape and affixing said sheared portions to the bottom of said microelectronic circuit cases,
e. a second work station for forming the circuit leads to a desired configuration, said second work station including punch means for shearing and forming said circuit leads, said punch means comprising an upper punch portion and a lower platen portion conforming to the desired lead configuration,
f. a third work station for applying solder to said formed leads, said third work station including punch means for shearing portions of a solder ribbon and cold-flowing said sheared portions about said formed leads,
g. a second test station for testing processed circuits prior to unloading at said output station, and a second eject station for removing carriers containing defectively processed circuits,
h. an output station for receiving the processed microelectronic circuits, and
i. control means for automatically advancing circuit carriers from said input station to each of said work stations and to said output station, and for controlling operations at each of said work stations.

18. Automatic processing equipment as defined by claim 17 wherein said conveyor means includes a metal tape member, a plurality of raised and flexible detents, channel defining members for accommodating said tape member and circuit carriers riding thereon, and means for reciprocally moving said tape member.

* * * * *